United States Patent [19]

Hess

[11] Patent Number: 5,226,333
[45] Date of Patent: Jul. 13, 1993

[54] DEEP-WELL THERMAL FLOWMETER

[75] Inventor: Alfred E. Hess, Boulder, Colo.

[73] Assignee: The United States of America as represented by the Secretary of the Interior, Washington, D.C.

[21] Appl. No.: 707,541

[22] Filed: May 30, 1991

[51] Int. Cl.[5] .................. G01F 1/704; G01F 1/68; E21B 47/00
[52] U.S. Cl. .................. 73/155; 73/861.95; 166/241.5
[58] Field of Search .............. 73/155, 861.95, 861.05, 73/204.11, 204.17, 204.19, 204.22, 204.23, 204.25, 204.27; 166/64, 241.5

[56] References Cited

U.S. PATENT DOCUMENTS

| | | | |
|---|---|---|---|
| 1,254,374 | 1/1918 | Thomas | 73/204.25 |
| 1,260,498 | 3/1918 | Wilson | 73/204.27 |
| 2,580,182 | 12/1951 | Morgan et al. | 73/204.17 |
| 2,697,941 | 12/1954 | Moore et al. | 73/155 |
| 2,733,605 | 2/1956 | Buck | 73/155 |
| 3,922,912 | 12/1975 | Bradbury et al. | 73/861.95 |

OTHER PUBLICATIONS

Albert, Henry J., and Robert H. Wood, "High-Pressure, thermal-pulse, liquid flow meter", Rev. Sci. Instrum. 56(10) Oct. 1985, pp. 1962–1963.

Primary Examiner—Hezron E. Williams
Assistant Examiner—Michael J. Brock
Attorney, Agent, or Firm—E. Philip Koltos

[57] ABSTRACT

The flowmeter includes a planar wire grid immersed in the fluid flow perpendicular to the direction of fluid flow. Capacitors discharge an electrical current through the wire grid to heat the wire grid and thereby produce, by heat conduction, a thermopulse in the fluid. Temperature detectors are provided on both sides of the wire grid to detect the thermopulse. A timing device is provided for measuring the time interval between production of the thermopulse and detection thereof by the detectors. The time interval is representative of the flow rate of the fluid flow.

21 Claims, 8 Drawing Sheets

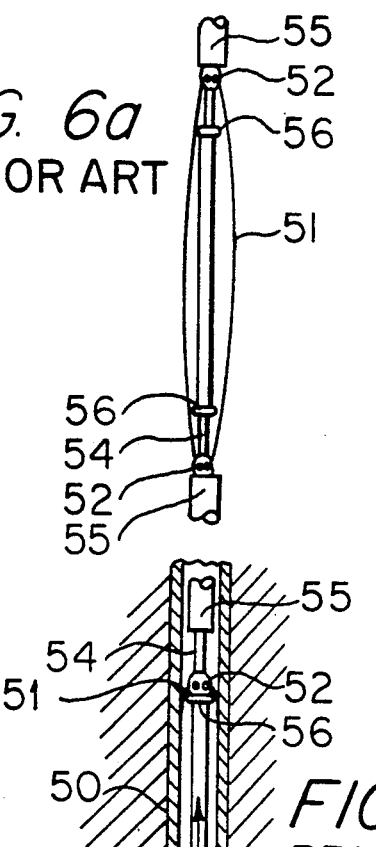
FIG. 6a PRIOR ART
FIG. 6c PRIOR ART
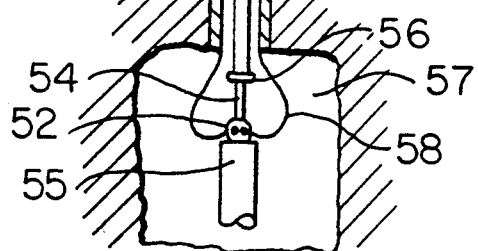
FIG. 6b PRIOR ART
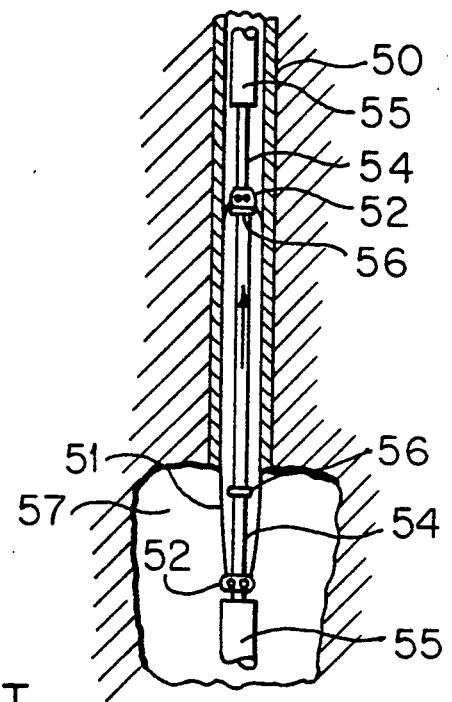
FIG. 6d
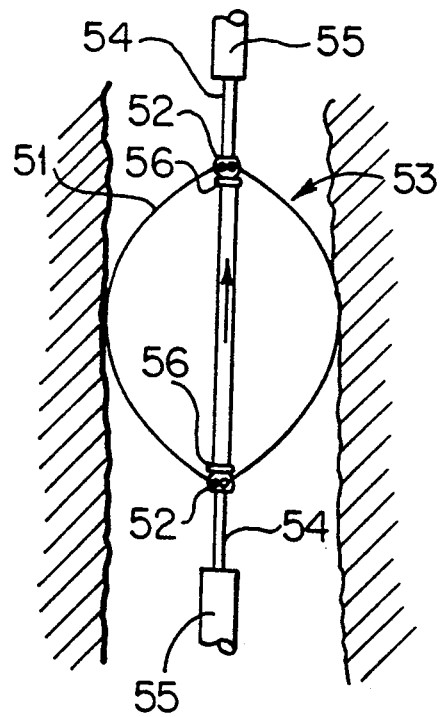
FIG. 6e

DEEP-WELL THERMAL FLOWMETER

FIELD OF THE INVENTION

The invention relates to fluid flowmeters and in particular to a thermal fluid flowmeter for measuring fluid flow in boreholes or wells.

BACKGROUND OF THE INVENTION

Various flow meters have been developed for the purposes of detecting and measuring water flow through and between boreholes to thereby determine the hydrology in surrounding geologic formations. However, such devices have been found to be generally unsatisfactory for measuring slow to medium fluid flow rates in low to medium viscosity fluids.

An example of a flowmeter in common use is the "spinner" flowmeter (reported by Keys, W. S., and MacCary, L. M., in 1971 in "Application of borehole geophysics to water resources investigations," U.S. Investigations, Book 2, Chapter E1, p. 109). However, the spinner flowmeter has a minimum flow velocity sensitivity of about 2 to 4 feet/minute (1 to 2 mm/sec) in wells of 4-inch or larger diameter and as high as 10 feet/minute in 2-inch diameter wells and, thus, the spinner flowmeter is not capable of measuring slow fluid flows.

Other examples of flowmeters include gas anemometers and other continuous heat-transfer devices. See, for example, Chapman, H. T., and Robinson, A. E., 1962, "A thermal flowmeter for measuring velocity of flow in a swell": U.S. Geological Survey Water-Supply Papter 1544-E, 12 p.; and Morrow, T. B., and Kline, S. J., 1971, "The evaluation and use of hot-wire and hot-film aneomometers in liquids": Standord, Calif., Stanford University, Department of Mechanical Engineering, Thermosciences Division, Report MD-25, 187 p. Although some such devices are sensitive to slow fluid flow, none can be relied upon as an accurate quantitative flowmeter under normal borehole conditions. In particular, such devices must be recalibrated frequently if the sensing surface of the device becomes coated by a substance such as mud, lint, or a mineral deposit.

Further examples of flow measuring techniques include fluid-temperature and fluid-resistivity or fluid-conductivity logs Sorey, M. L., 1971, "Measurement of vertical ground-water velocity from temperature profiles in wells": Water Resources Research, v. 7, no. 4, p. 963–970. Such techniques are useful in locating the entrance and exit of contrasting fluids in a borehole but provide little quantitative information relating to the velocity or volume of flow.

Another class flowmeters are the "tag-trace" flowmeters wherein a detectable "tagging" solution or gas is deposited in the fluid flow to be measured. The fluid flow rate is then determined by monitoring the movement of the solution or gas carried by the fluid. Tracer sensing is accomplished by means, dependent upon the nature of the "tagging" solution, such as fluid resistivity detectors, radio-active radiation detectors, florescence detectors, etc.

Of "tag-trace" flowmeters, the most commonly used are radioactive-tracer/gamma-ray detector techniques described by Bird, J. R. and Dempsey, J. C., 1955, "The use of radioactive tracer surveys in water-injection wells": Lexington, Ky. Geological Survey Special Publication 8, 10 p.; and Edwards, J. M., and Holter, E. L., 1962, "Applications of a subsurface solid-state isotope injector to nuclear-tracer survey methods": Journal of Petroleum Technology, v. 14, no. 2, p. 121-124; and brine-tracer/fluid-resistivity detector techniques described by Patten, E. R., and Bennett, G. D., 1962, "Methods of flow measuement in well bores": U.S. Geological Survey Water-Supply Paper 1544-C, 28 p. 1971; and the Keys and MacCary reference mentioned above. See, as examples, U.S. Pat. No. 4,507,552 (Roesner et al) which describes a system employing a radio-active tracer element and U.S. Pat. No. 4,805,450 (Bennett et al) which describes a system employing a tracer gas. However, such techniques are slow and are therefore expensive to perform. Also, a difference in density between the "tagging" fluid and the borehole fluid causes an uncertainty in the measurement of slow velocity flows. This uncertainty frequently exceeds the actual fluid velocity thus rendering the results completely unreliable.

A thermal-pulse borehole flowmeter was developed by "Dudgeon, C. R., Green, J. J., and Smedmore, W. J., 1975, "Heat-pulse flowmeter for boreholes": Medmenham, Marlow, Bucks, England, Water Research Centre Technical Report TR-4, 69 p; (1975) which used a tag-trace technique with a heated "tagging" solution better adapted to measuring a slow flow velocity. However, it was found that this device is not capable of withstanding the high pressure associated with deep boreholes. Further, resistance variations, occurring in a connecting cable used to connect the probe of the flowmeter to a surface station, adversely effects the measurements received by the ground station. Stray electrical currents, commonly occurring in the geologic strata surrounding a borehole, also adversely effect the measurements received by the surface station. Other disadvantages include the necessity of using a 6-conductor cable to connect the flowmeter probe to the surface station and the necessity of using a hydraulically powered centering device including a hydraulic line connecting the probe to the surface.

SUMMARY OF THE INVENTION

In accordance with the invention, a device is provided for measuring slow fluid flows in boreholes which overcomes the disadvantages of the prior art discussed above.

The flowmeter of the invention comprises a thermopulse producing means for heating a portion of the fluid flow thereby producing a thermopulse in the fluid flow which travels along with the fluid flow. A thermopulse detecting means detects the thermopulse in the fluid flow, the thermopulse detecting means including first and second temperature sensing means positionable in the fluid flow on opposing sides of, and at known distances from, the thermopulse producing means. A measuring means is provided for measuring the time interval between production of the thermopulse and the detection thereof by the thermopulse detecting means, this time interval being representative of the flow rate of the fluid flow.

In accordance with a preferred embodiment, the thermopulse producing means comprises a substantially planar insulated resistance wire grid immersed in the fluid flow at an angle perpendicular to the direction of fluid flow. Electrical means are provided for conducting an electric current through the wire grid to heat the grid and thereby produce, by heat conduction, the thermopulse in the fluid flow.

The temperature sensing means preferably comprise thermistors. The thermistors are advantageously mounted adjacent to the wire grid upon opposing posts which are aligned parallel to the direction of fluid flow. This arrangement minimizes dispersion of the thermopulse resulting from turbulence within the fluid flow caused by the presence of the mounting.

Preferably, the first and second thermistors respectively provide temperature signals representative of the temperature of the fluid as a function of time. In a preferred implementation, a means is provided for transmitting the temperature signal provided by either the first or second thermistor to a clock-driven chart recorder for recording the fluid temperature as a function of time. A means is also provided for subtracting the temperature signals, one from the other, to provide a temperature difference signal for transmission to the clock-driven chart recorder. A change in the difference signal indicates the presence of the thermopulse at one of the thermistors. The polarity of the difference signal indicate the direction of flow. Preferably, the temperature and temperature difference signals are simultaneously transmitted on a single transmission cable using a technique wherein the frequency related signals are converted to constant width bipolar pulses having different pulse widths.

In accordance with another aspect of the invention a centering means is provided for centering the flowmeter within the center of a borehole. The centering means preferably comprises a mandrel on which an upper and lower slider may slide, to which is connected a plurality of bow springs of a selected length each having upper and lower ends. The upper ends of the bow springs are connected to the mandrel by the upper slider adapted to slide along the mandrel between upper inside slider stop and any upper outside slider obstruction. The lower ends are connected to the mandrel by a lower slider adapted to slide along the mandrel between lower inside slider stop and any lower outside slider obstruction. The upper inside slider stop is advantageously positioned along the mandrel at least the certain length from any lower outside slider obstruction, and the lower inside slider stop is positioned along the mandrel at least the selected length from any upper outside slider obstruction, such that the bowsprings can fully extend to along the mandrel relative to either the upper or lower slider stops. The flowmeter probe is connected to, or is itself the mandrel.

A flowmeter constructed in accordance with the invention is more sensitive than the commonly used spinner flowmeter, more accurate and convenient to use than non-thermal "tag-trace" techniques, more convenient and dependable than the heat-pulse flowmeter reported by Dudgeon et al in the reference referred to above. Further, the flowmeter is usable in deep boreholes on long logging cables.

The flowmeter of the invention is particularly useful to geologists, hydrologists and geophysical scientists in the study of the geohydrology of aquifers and water bearing fractures, using only conventional geophysical logging equipment. Additionally, the flowmeter is useful for any endeavor where a measurement of slow velocity fluid flow is needed, especially if such measurements must be made at high pressures and relayed through long cables. The constant-width bipolar pulse transmission technique of the invention is also useful for any application where multiple signal transmission is required through long cables, and wherein the resistance of the cable changes with time or temperature.

Other advantages of the flowmeter of the invention include the ability thereof to measure very slow fluid velocities (<0.1 ft/min) and the ability to withstand very high pressure (>500 bars). In addition, probe power and signal transmission techniques are employed which require an interconnecting (logging) cable having only four conductors including armor in contrast to a prior art thermal flowmeter which requires six conductors.

According to a further aspect of the invention, a pulse shaping circuit is provided which converts square-waves or unipolar pulses into fixed width symmetrical bipolar pulses that propagate over long electrical cables with less degradation of signal quality than unipolar pulses. Further, an operator adjustable, switching type, voltage regulated power supply is provided for the heater-grid power which uses optical coupling in the voltage control circuit and the switching frequency of which is twice that of the AC power mains so as to allow for rapid recharging of the heater grid energy storage capacitor while limiting the charging current to a value which will not cause component failure.

In addition, a heater-grid power supply is provided including voltage and current monitoring circuits which determines when the remote heater energy storage capacitor has reached the pre-set voltage level by determining when the charging current to the heater storage capacitor has decreased to a pre-set low level, such as 1 milliamp, and which turn on a "heater-power ready" pilot light when such a condition exists.

Still further, a graphical flow calibration chart is provided which shown the flowmeter response to fluid velocity as a function of reciprocal time, which provides an easy to read, substantially linear calibration curve, especially in the region of very slow flow velocities, and also which indicates the direction of flow. This is a substantial improvement over the traditional calibration chart which shows fluid velocity as a function of time, and which plots as two disconnected hyperbolic curves that are difficult to read in the very slow flow region.

In addition, a non-jamming style of bow-spring centralizer is provided which keeps the flow sensor centered in the borehole where the flow velocity is most representative of the average flow at that depth.

Other features and advantages of the invention will be set forth in, or will be apparent from, the detailed description of the preferred embodiment which follows.

BRIEF DESCRIPTION OF THE DRAWINGS

FIG. 5b is a graph showing waveshapes generated by the pulse shaper and cable driver of FIG. 5a.

FIGS. 6a, 6b and 6c are side elevational views of a prior art probe showing a bow-spring centralizer in use.

FIGS. 6d and 6e are side elevational views of the non-jamming blow-spring centralizer which is used with flowmeter of FIG. 1.

DETAILED DESCRIPTION OF THE PREFERRED EMBODIMENT

Referring to the figures, a preferred embodiment of the invention will now be described.

The deep-well thermal-pulse flowmeter of the invention senses fluid flow by heating a portion of the fluid flow, i.e. by producing a "thermopulse" within the fluid flow, and then by timing the movement of the thermopulse as it flows a short distance through a hollow sensor tube.

Figure 1:
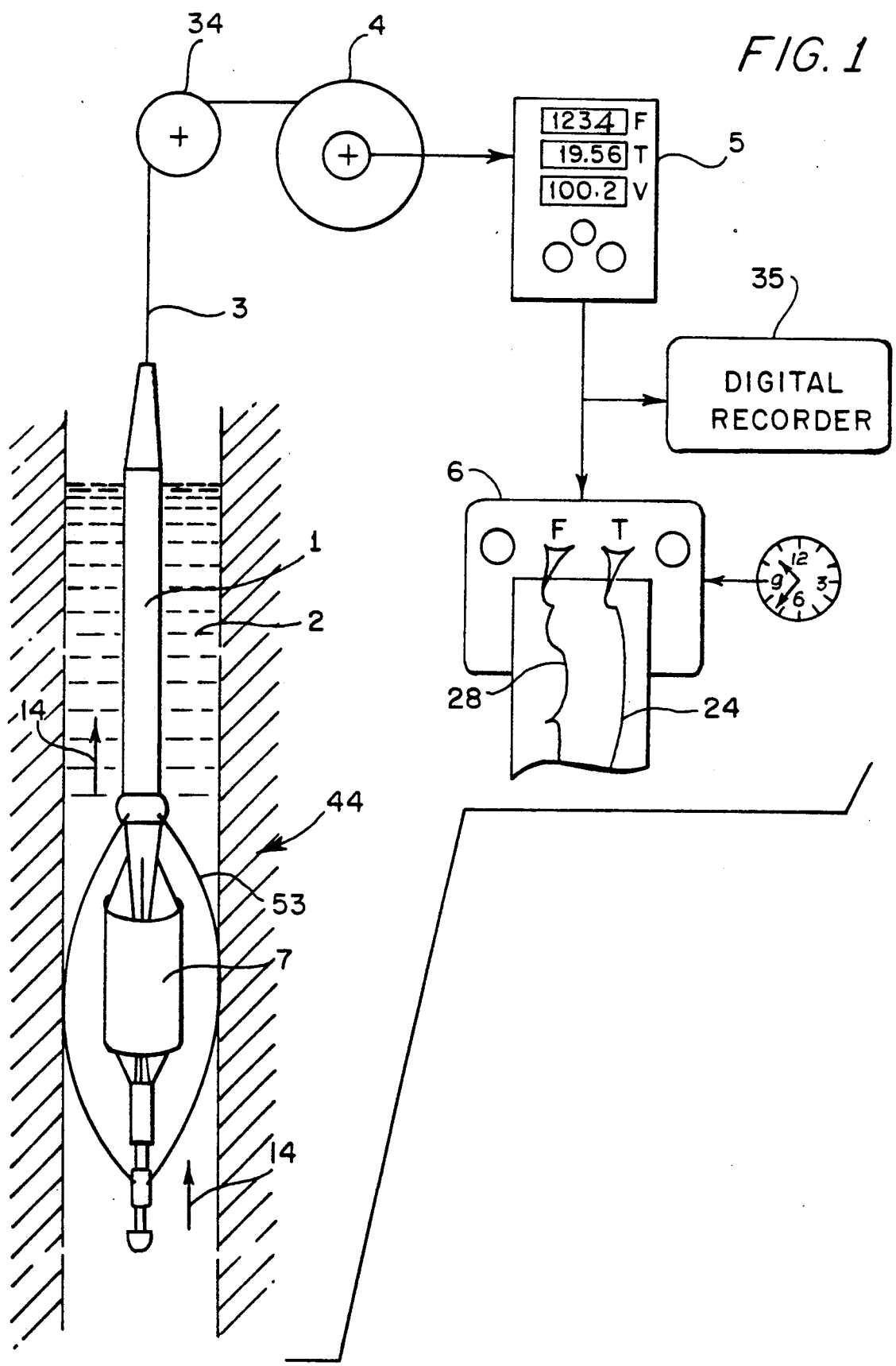
FIG. 1 is schematic of a thermal flowmeter system constructed in accordance with a preferred embodiment of the invention.

The flowmeter, FIG. 1, includes a probe 44 which provides signals corresponding to the rate of fluid flow and temperature of the fluid, a surface module 5 which powers and controls probe 44, and a conventional clock-driven strip-chart recorder 6 and a conventional digital recorder 35 which record signals provided by probe 44. It will be understood that either strip-chart recorder 6 or digital recorder 35 or both can be used. Probe 44 comprises a fluid flow sensor 7 which includes temperature sensing elements, and an electronics module 1 which includes supporting electronics. Fluid flow sensor 7 is supported by opposing support posts SP which are aligned parallel with the direction of fluid flow (indicated by arrows 14).

Probe 44 is lowered into a borehole 2 on an electrical logging cable 3 by a winch 4. Cable 3 connects probe 44 to surface module 5 and allows for electrical power and communication therebetween.

Probe 44 senses both the temperature and the flow rate of fluid flowing in borehole 2. In FIG. 1, the fluid flow is, as stated, represented by reference numeral 14 and is shown as an upflow, i.e. the fluid is rising within borehole 2. However, as will be apparent from the description below, probe 44 is adapted to measure both up-flow and down-flow within borehole 2.

Chart recorder 6 and digital recorder 35 record the rate of fluid flow and absolute temperature of the fluid flow as measured by probe 44. The temperature of the fluid flow is represented on recorder 6 by a temperature curve 24. The rate of fluid flow is represented on recorder 6 by a flow rate curve 28. The rate of fluid flow and the fluid temperature signals may be stored in digital recorder 35 for processing by a digital computer.

A vertical profile of the fluid flow rate in borehole 2 can be produced by measuring fluid flow rate as a function of depth within borehole 2. The depth of probe 44 is determined by measuring the length of cable 3 that is reeled out as probe 44 is lowered into borehole 2. The length of cable reeled out is measured by a conventional cable length measuring system 34. From the depth/flow profile one can determine the location at which water fluid enters or exits borehole 2. Further, depth flow profile information can be combined with information collected from other geophysical logging probes to determine, for example, the hydraulic conductivity of geologic formations in the vicinity of the probes.

Probe 44 is centered in borehole 2 by a self-adjusting bow spring centralizer 53 which maintains probe 44 in the center of borehole 2 such that an accurate fluid flow rate is measured, i.e. the fluid flow rate at the center of borehole 2 is least affected by turbulence occurring near the walls of borehole 2.

Having generally described the elements of the invention with respect to FIG. 1, each of the various elements will now be described in detail with reference to the remaining figures.

Figure 2:
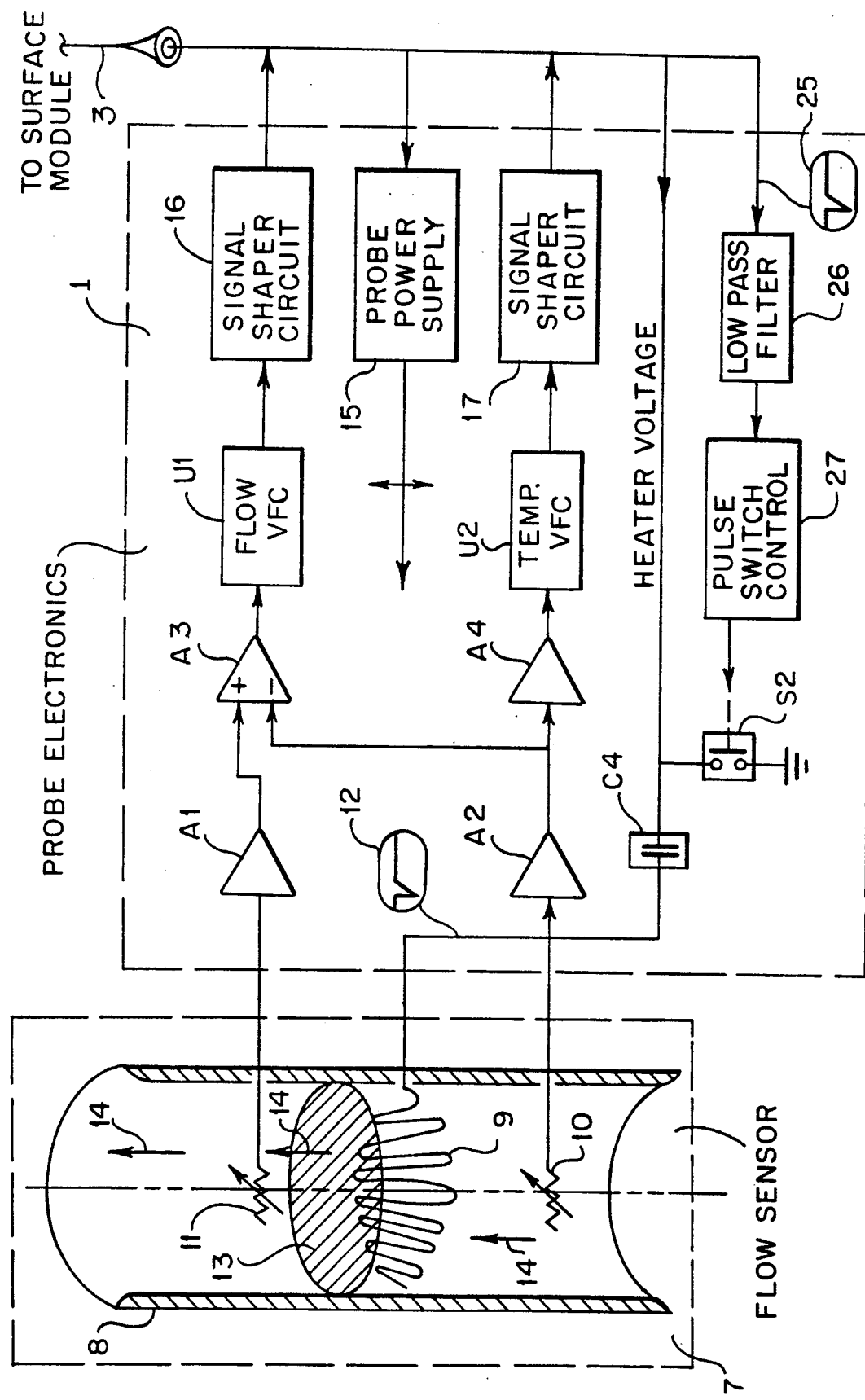
FIG. 2 is a schematic diagram showing a fluid flow probe and a probe electronics section of the flowmeter system of FIG. 1.

Referring to FIG. 2, fluid flow sensor 7 comprises a hollow tube 8 enclosing a resistance wire heater grid 9 and a pair of insulated temperature sensors 10 and 11. Heater grid 9 is comprised of an open serpentine-weave of electrically insulated resistance wire formed in a plane perpendicular to the axis of tube 8. Grid 9 is centered between the ends of tube 8.

Insulated temperature sensors 10 and 11 are located within the sensor tube an equal distance on either side of heater grid 9. Temperature sensors 10 and 11 are of conventional design and can comprise, for example, insulated glass-bead thermistors.

A thermopulse, represented in FIG. 2 by reference numeral 13, is produced in the fluid flow by conducting an electric current pulse 12 from a high-voltage capacitor C4 through heater grid thus heating grid 9 and thereby also heating a portion of fluid flowing past grid 9. Since grid 9 is generally planar, thermopulse 13, produced by heat conduction from grid 9, is likewise planar. Discharge of capacitor C4 is triggered by a triggering pulse 25 transmitted from surface module 5. The triggering mechanism for triggering capacitor C4 and a system for providing power to capacitor C4 are described below.

Thermopulse 13, moves with the fluid flow through sensor tube 8 past one of the two temperature sensors 10 or 11. By locating temperatures sensors on both sides of grid 9, fluid flow in either the up-flow or down-flow direction is measurable.

Temperature sensors 10 and 11 are connected to a differential temperature sensing circuit within probe electronics 1 comprising amplifiers A1, A2 and A3 contained within electronics module 1. A voltage signal representative of the temperature detected by temperature sensor 11 is received and amplified by amplifier A1. Likewise, a voltage signal representative of the temperature detected by temperature sensor 10 is received and amplified by amplifier A2.

Differential amplifier A3 receives and combines voltage signals from amplifiers A1 and A2 and produces a differential voltage representative of the difference between the temperatures detected by temperature sensor 10 and temperature sensor 11. The temperature differential voltage is converted to a square wave variable frequency signal by a flow voltage-to-frequency converter (VFC) U1. The square wave signal is then converted by a flow signal shaper circuit 16 into a series of fixed-width bipolar pulses wherein the frequency of the pulse-train corresponds to the frequency of the square wave signal output from VFC U1. The fixed-width bipolar pulse-train is continuously transmitted to surface module 5 through cable 3. Flow VFC U1, flow signal shaper circuit 16, and the precise nature of the fixed-length bipolar pulses are described below.

Amplifier A4 receives and amplifies voltage directly from amplifier A2. Unlike differential temperature amplifier A3 which produces a voltage representative of the difference in temperature detected by sensors 10 and 11, amplifier A4 produces a voltage representative only of the temperature of the fluid as measured by temperature detector 10. The temperature related voltage amplified by amplifier A4 is converted to a square wave variable frequency signal by a temperature voltage-to-frequency converter (VFC) U2. The square wave signal output from VFC U2 is converted by a temperature signal shaper circuit 17 into a series of fixed-width bipolar pulses wherein the frequency of the pulse-train corresponds to the frequency of the square wave signal output from VFC U2.

Thus the flow-related frequency signal from flow signal shaper 16 and the temperature-related frequency signal from temperature signal shaper 17 are combined within cable 3 into one sequence of bipolar pulses wherein flow-related pulses have one width and temperature-related pulses have a different width. The combined sequence of bipolar pulses is then transmitted to surface module 5 along cable element 3.

Figure 3:
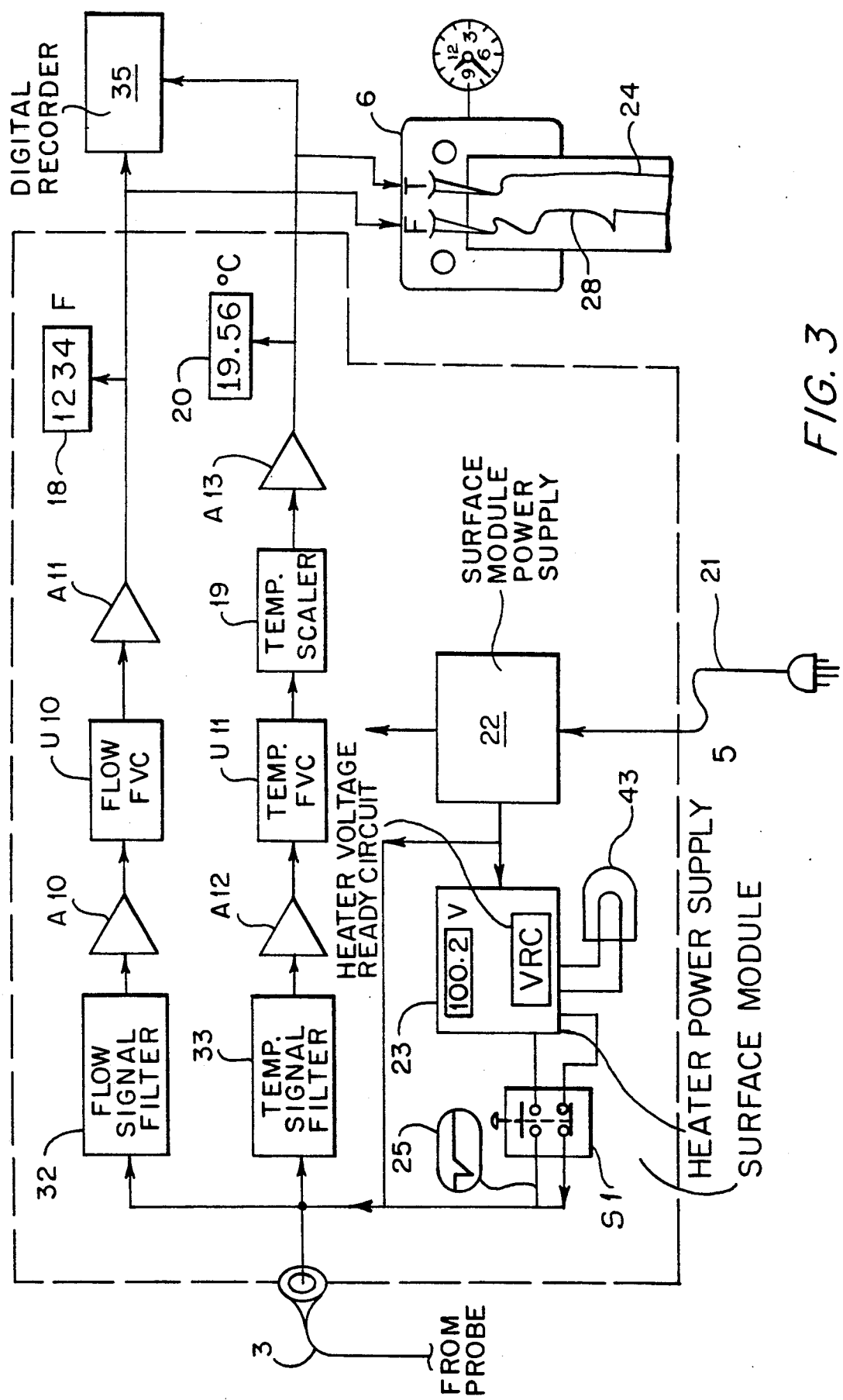
FIG. 3 is a schematic diagram showing a surface module of the flowmeter system of FIG. 1.

Referring to FIG. 3, in surface module 5 the fixed-width bipolar pulse-train received from probe electronics section 1 through cable 3 are split between a flow signal filter 32 and a temperature signal filter 33. Flow signal filter 32 is tuned to the width of the bipolar pulses of the flow signal such that only the flow signal portion of the combined bipolar polar pulse signals is passed through.

The flow signal pulses are amplified by an amplifier A10, then received by a frequency-to-voltage converter (FVC) U10 which generates a voltage proportional to the frequency of the flow signal pulses and thus also proportional to the flow signal itself. The flow proportional voltage from U10 is amplified by a amplifier A11 and finally received and displayed by digital panel flow meter 18 and strip-chart recorder 6.

Similarly, temperature signal filter 33 is tuned to the width of the bipolar pulses of the temperature signal and passes only the temperature signal pulses. The temperature signal pulses are amplified by an amplifier A12, then received by a FVC U11 which generates a voltage proportional to the frequency of the temperature pulse-signals. Thus the voltage output of FVC U11 is proportional to the water temperature.

A temperature scalar circuit 19 and an amplifier A13 receive the temperature proportional signal and provide an output voltage with a magnitude scaled to the actual water temperature. Thus, for example, scalar circuit 19 and amplifier A13 can be adjusted such that 0 volts corresponds to a temperature of 0° Celsius and 2 volts corresponds to 20° C., etc.

The scaled voltage is then received by a panel temperature-meter 20 and chart recorder 6 which directly display the temperature of the fluid flow. Preferably temperature-meter 20 comprises a 4-digit panel meter having a range from 0 to ±9.999 volts, such that temperature meter 20 is capable of displaying temperatures ranging from 0 to ±99.99° C. with a resolution of 0.01 C. The remaining elements of FIG. 3 are described below with reference to the generation of a triggering pulse.

As noted above, the fluid flow temperature traces are represented on strip chart recorder 6 by reference numeral 24 and the fluid flow velocity traces are represented by reference numeral 28.

FIG. 4 provides a graph of typical flow response traces 28. Upward-moving water produces a positive differential-temperature response peak 30, shown in FIG. 4a, and downward-moving water produces a negative differential-temperature response peak 31 shown in FIG. 4b.

Flow response time is determined by measuring the time interval between the triggering time represented on trace 28 by pulse 29 and the peak of the differential-temperature response, 30 or 31. Typical flow transit times range from less than 1 second for a fast fluid flow to more than 1 minute for a slow fluid flow.

Figure 4A:
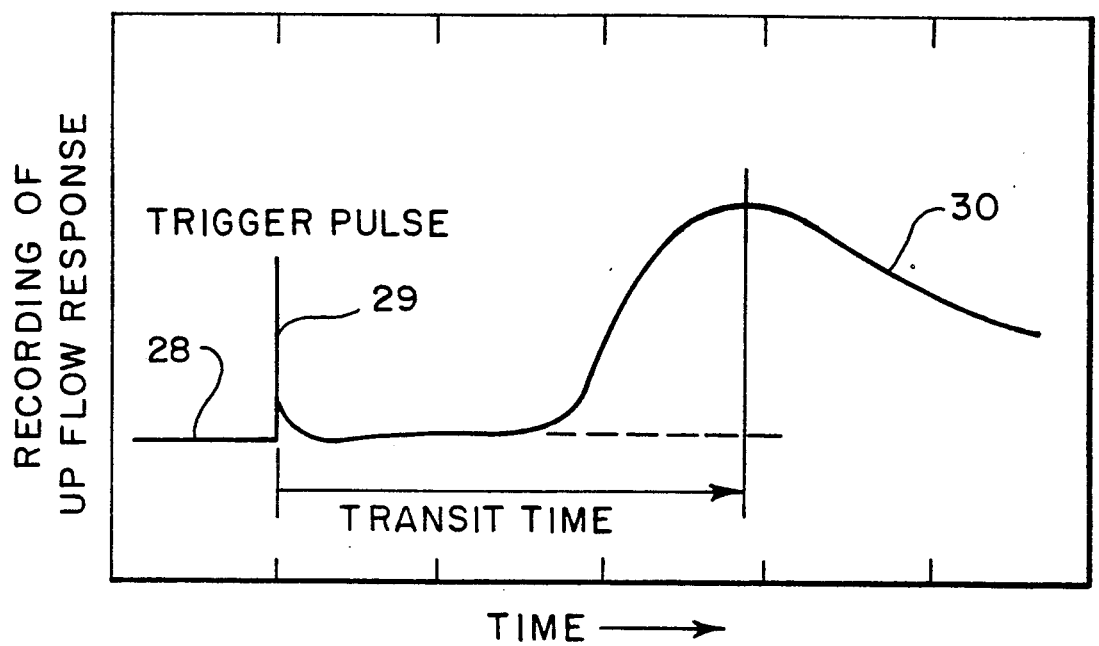
FIG. 4a is a graph showing an exemplary recording of a fluid upflow response as measured by the flowmeter system of FIG. 1.
Figure 4B:
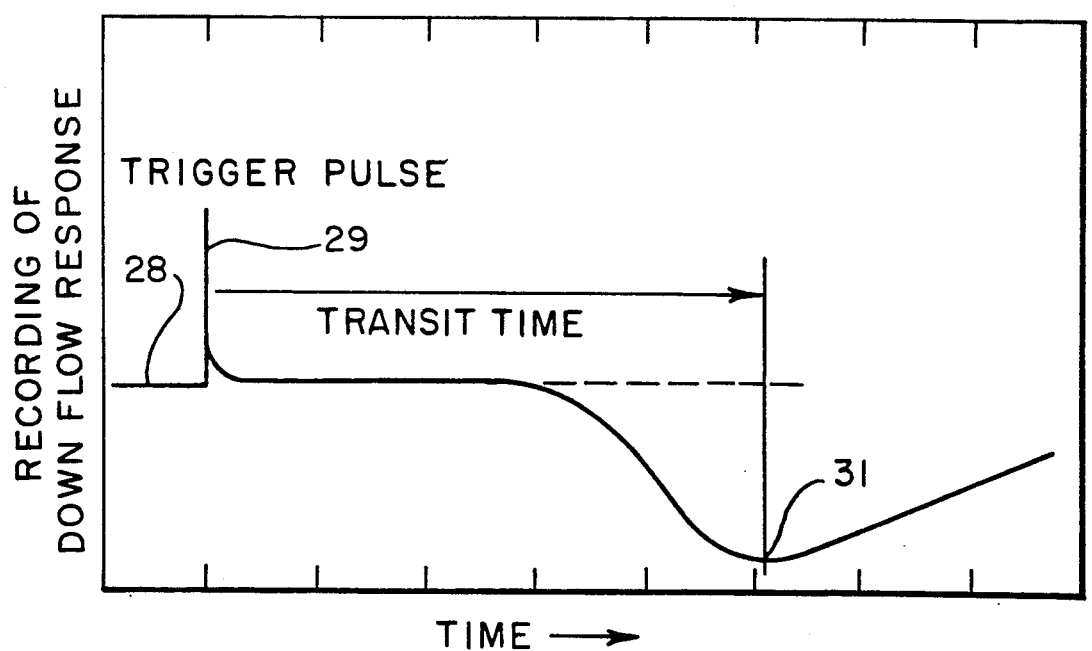
FIG. 4b is a graph showing an exemplary recording of a fluid downflow response measured by the flowmeter system of FIG. 1.
Figure 4C:
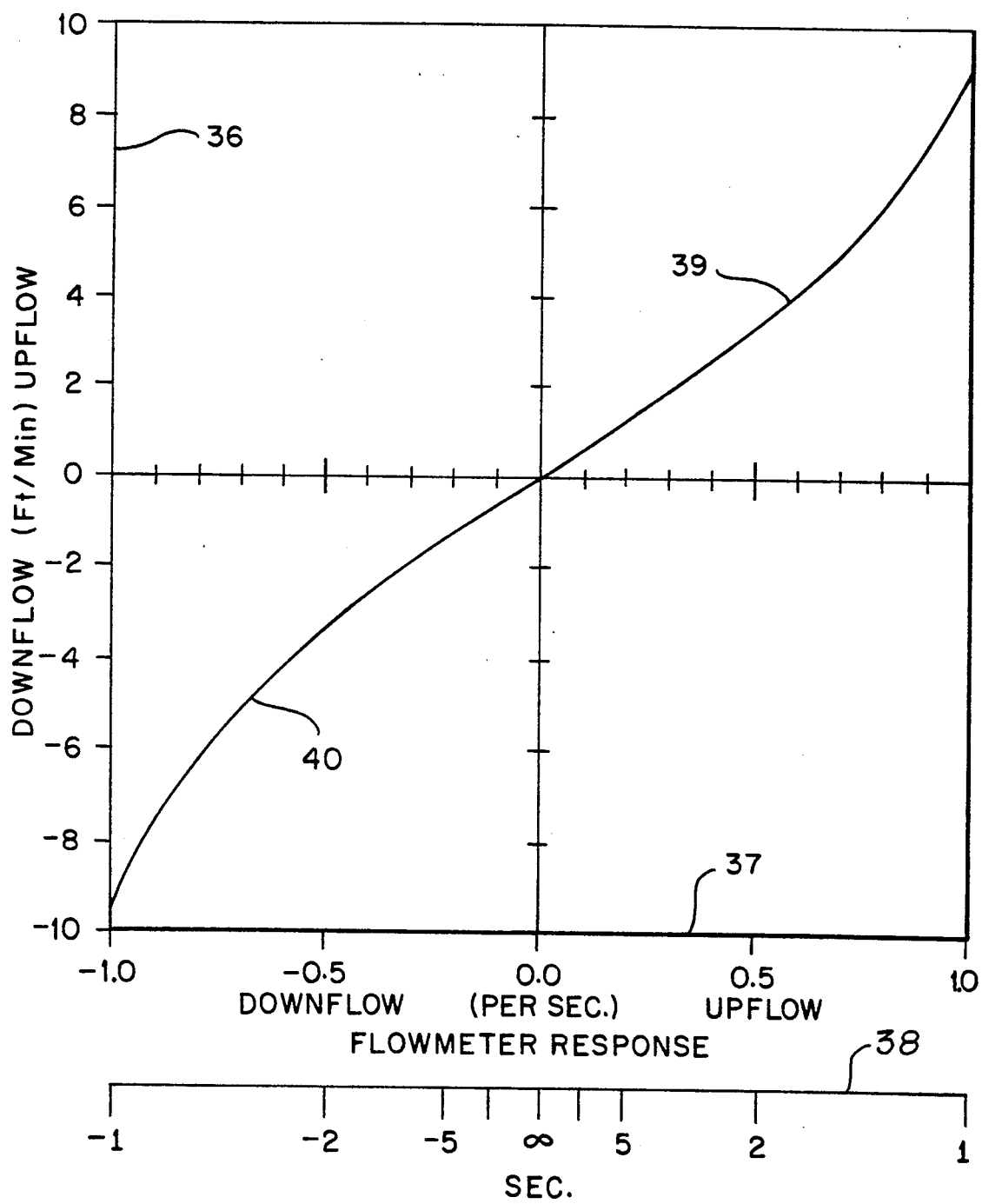
FIG. 4c is an exemplary easy to read fluid flow calibration chart showing fluid flow velocity as a function of flowmeter response for the flowmeter of FIG. 1.

FIG. 4c provides a typical graphical flow calibration chart showing fluid velocity 36 plotted against flowmeter response 39 and 40 expressed in units of reciprocal time 37. In FIG. 4c vertical coordinate 36 indicates water velocity in feet/minute while horizontal coordinate 37 indicates flowmeter response 39 and 40 in reciprocal time, per second. As can be seen from FIG. 4c, the flowmeter response 39 and 40 is a substantially linear function of fluid flow. A nonlinear horizontal scale 38 is also provided in FIG. 4c which indicates response time in seconds. Upflow response 39 is positive, while downflow response 40 is negative.

Figure 4D:
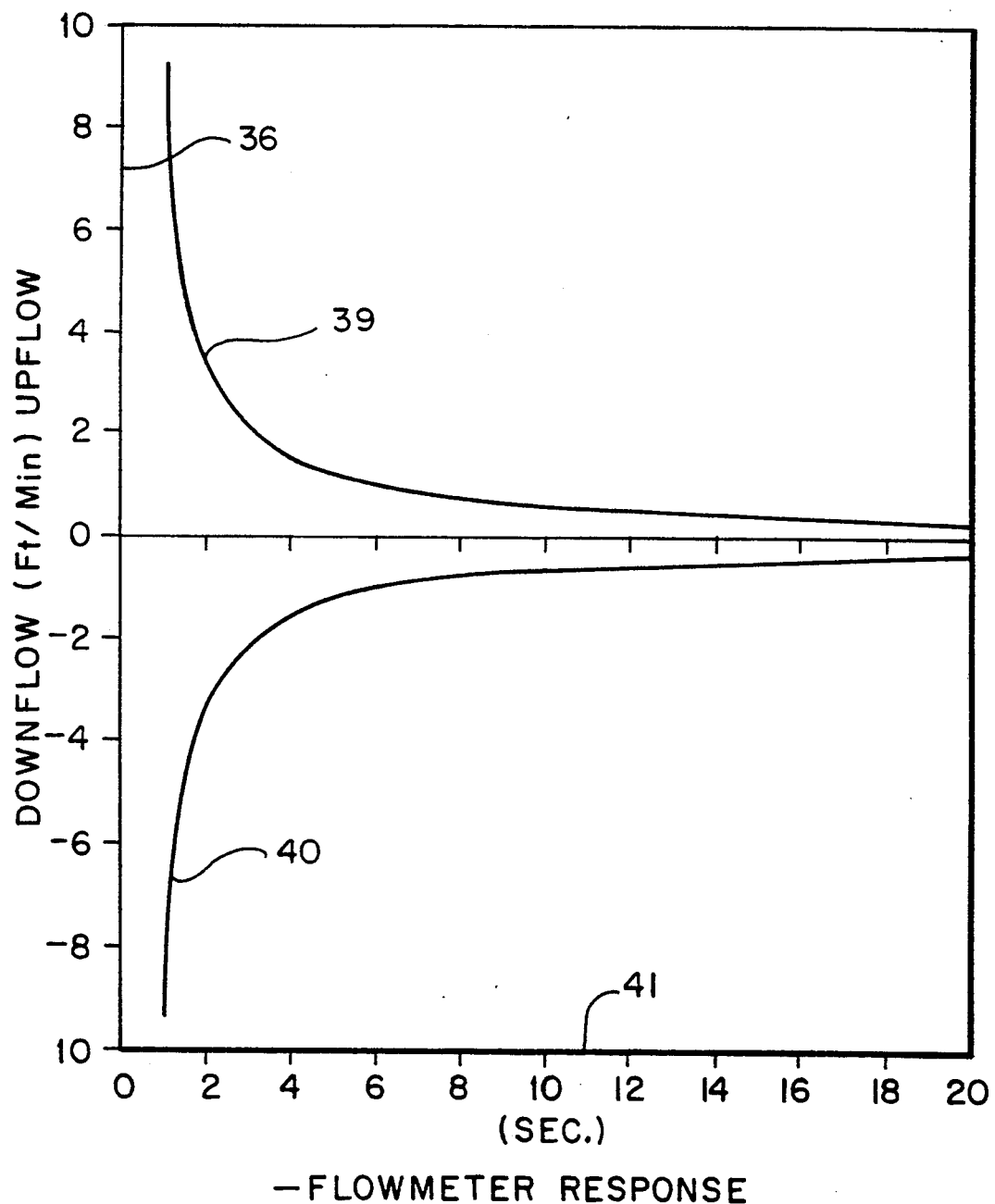
FIG. 4d is an exemplary prior art chart showing fluid flow velocity as a function of flowmeter thermal pulse travel time.

The prior art flow calibration chart in FIG. 4d shows fluid velocity 36 plotted against flowmeter response 39 and 40 in seconds 41. It will be seen that the substantially linear flowmeter response curves 39 and 40 of FIG. 4c are easier to use than the two hyperbolic response curves 39 and 40 of FIG. 4d, especially at very slow fluid velocities.

Water velocities ranging from about 0.1 to about 20 feet per minute have been measured with the thermal flowmeter, and it has resolved water velocity differences as small as 0.03 foot per minute. The flowmeter is most sensitive to slow fluid flows in wells with diameters only slightly larger than the diameter of flow sensor tube 8. For a well having a diameter more than twice the diameter of the flow-sensor tube 8, the sensitivity to very slow fluid flow speeds is somewhat impaired.

A flow concentrating device, (not shown) can be installed between the flow sensor tube 8 and the wall of the well 2 to concentrate all flowing water through the flow sensor 8. If configured such that the entire fluid flow 14 is directed through the flowsensor 8, a useful flow measuring range from about 0.01 to about 5 gallons per minute is achieved.

Returning to FIG. 3, all electrical power for the flowmeter is obtained from an external source 21 such as from an AC powerline, a motor-generator, or a battery. Source 21 provides all required electrical power for surface module 5, and probe 44 through a surface module power supply 22. Also included in surface module 5 is an operator adjustable, regulated heater-voltage supply 23 which provides power to probe heater 9 via cable 3. Heater-voltage power supply 23 provides voltage-regulated power to probe 44 for charging capacitor C4, of FIG. 2.

Included in power supply 23 is a heater-voltage ready circuit VRC which uses an optically-coupled variable resistor (not shown) to sense whether energy storage capacitor C4 has stored a sufficient charge. The heater-voltage ready circuit VRC operates by sensing whether the charging current to capacitor C4 is below a value of less than some very low current such as 1 milliampere thus assuring that capacitor C4 is charged to the desired voltage level. The heater-voltage ready circuit VRC illuminates a heater-voltage-ready panel light 43 once the desired charge level has been attained.

Now referring to FIGS. 2 and 3, one flow-measurement cycle will be described in detail. The flow measurement cycle is initiated by an operator by briefly pressing switch S1 located on surface module 5 and connected between the surface module power supply 22 and cable 3. By pressing switch S1, heater-voltage power, normally conducted to electronics module 1, is momentarily disconnected and a negative triggering pulse, represented in the drawings by numeral 25, is sent through cable 3 to the probe electronics module 1.

Within electronics module 1, triggering pulse 25 is separated from previously generated flow and temperature signals, and from extraneous noise, by a low-pass filter 26. The reshaped triggering pulse activates a pulse switch control circuit 27 which, in turn, activates heater-voltage electronic switch S2. Once switch S2 is activated, the energy stored in capacitor C4 is transferred to heater grid 9 as an electrical energy pulse 12. As discussed above, energy pulse 12 is transferred from capacitor C4 to heater grid 9 which heats the grid and thereby heats by direct thermal conduction the fluid flowing past the grid and thus provides a discrete thermopulse within the fluid flow. Heated thermopulse of water 13 flows with the fluid flow past temperature sensor 10 or 11 as has been previously described.

After switch S1 is released by the operator, capacitor C4 is recharged from heater power supply 23 and energy is stored by capacitor C4 for another flow measurement cycle.

An attenuated portion of energy pulse 12 is transmitted from probe electronics module 1 through cable 3 to surface module where the attenuated portion of energy pulse 12 is added to flow response signal 28 and recorded on chart recorder 6 thus producing a trigger-time reference-pulse 29 on the recording, as described above in reference to FIG. 4.

Figure 5A:
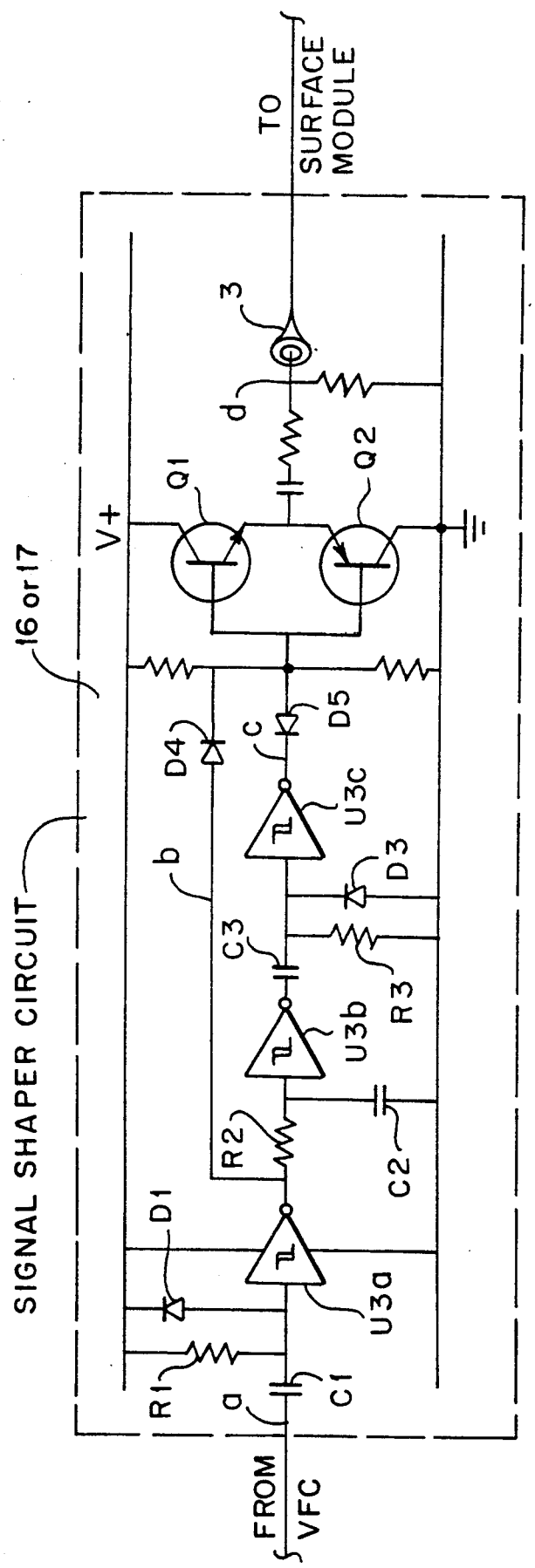
FIG. 5a is a schematic diagram of a pulse shaper and cable driver of the flowmeter of FIG. 2.

A schematic diagram of signal shaper circuits 16 and 17 is provided in FIG. 5a. Both circuits are structurally identical and, for brevity, are described with reference to the one schematic drawing of FIG. 5a. The only operational difference between circuits 16 and 17 is that a different input is received, i.e. a temperature related signal is received by temperature signal shaper 17 whereas a flow related signal is received by flow signal shaper 16.

The pulse shaper portion of signal shapers 16 and 17 includes an integrated circuit comprising three Schmidt-trigger inverters U3$_a$, U3$_b$, and U3$_c$. Resistors R$_1$,R$_2$,R$_3$, capacitors C$_1$,C$_2$,C$_3$, and diodes D$_1$, D$_3$, D$_4$, D$_5$ provided and are configured as shown. Also provided are complimentary power transistors Q1 and Q2.

Figure 5B:
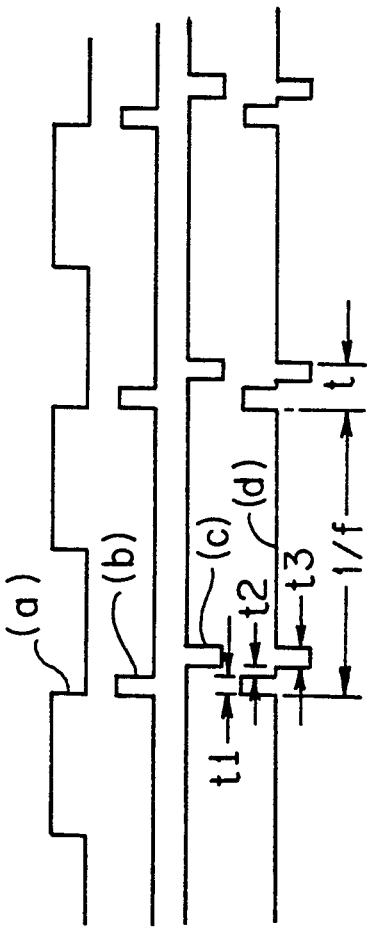

A wave-shape diagram showing the shape of the square wave signal at various points within circuits 16 and 17 is provided in FIG. 5b. The square wave inputs received from U1 or U2—corresponding to the flow signal and the temperature signal respectively—are designated as signal a. The frequency of the square wave input is designated as "f" and is a function of either the temperature of the fluid detected by sensor 10 or the temperature differential as detected by sensors 10 and 11.

The output of Schmidt inverter U3$a$ is designated as signal (b), a positive pulse with pulse width t1. The pulse polarity and pulse width t1 of pulse (b) is determined by capacitor C1, resistor R1, diode D1 and the characteristics of Schmidt inverter U3$a$. Positive pulse (b) drives transistor Q1 through diode D4 to form the positive portion of bipolar pulse (d). Pulse (b) also drives U3$b$ after being delayed for time t2 by resistor R2 and capacitor C2 and the characteristics of Schmidt inverter U3$b$. The inverted trailing edge of pulse (b) which outputs from U3$b$ drives Schmidt inverter U3$c$ through C3. Capacitor C3, resistor R3, diode D3 and the characteristics of Schmidt inverter U3$c$ determine the polarity and width t3 of negative pulse (c) which drives transistor Q2 through diode D5 to form the negative portion of bipolar pulse (d). Thus, the width of bipolar pulse (d) is $t=t1+t2+t3<1/f$, where f is the repetition rate (frequency) of the bipolar pulse-train.

Thus, each pulse shaper, 16 and 17, converts a square wave input (a) into a sequence of fixed-width bipolar pulses (d) having width "t" and also having frequency "f". The fixed-width bipolar pulses (d) corresponding to both the flow and temperature signals are transmitted simultaneously through connecting cable 3 by transistors Q1 and Q2, respectively, to surface module 5.

The width "t" of the fixed-width bipolar pulses for the flow signal generated by circuit 16 is different from the width of the bipolar pulses from the temperature signal generated by circuit 17. Thus, although the signals become mixed in cable 3, the difference in pulse width allows the signals to be readily separated from each other by fixed frequency filters 32 and 33 in surface module 5.

The bipolar-pulse width "t" must be chosen such that "t" is always less than the inverse of the highest frequency transmitted, and yet is of sufficient length to be detectable by surface module 5 after transmission through cable 3.

In testing, frequencies of 1 Hz to 100 kHz were successfully transmitted through 15,000 foot logging cables. For this frequency range, bipolar-pulse widths ranging from 10 to 100 microseconds or greater can be transmitted.

The maximum pulse repetition frequency for each of the signals should be no greater than the inverse of the bipolar pulse-width t, i.e., $f<1/t$. Thus, for example, a bipolar-pulse having a width of 10 microseconds can be used to transmit a signal with frequencies up to 100 kHz, while a bipolar pulse having a width t of 100 microseconds can be used to transmit a signal with frequencies up to 10 kHz. There is no limit to minimum frequency except that imposed by other considerations, such as the amount of time required to transmit information. The frequencies of several signals can otherwise overlap without interference since they are separated in surface module 5 by signal filters 32 and 33 which are tuned to a single bipolar pulse-width.

As will be appreciated by those skilled in the art, the above-described technique of using bipolar pulses of different widths can be exploited to separate any number of signals which are simultaneously transmitted through a single conductor. Likewise, the technique can be employed where signals are transmitted over separated but parallel conductors where considerable cross-talk can result in intermixing of the signals.

In accordance with another feature of the invention a non-jamming bow-spring centralizer 53 for thermal flowmeter probe 44 is provided. Referring to FIGS. 6a-6e, a logging probe with a conventional bow-spring centralizer is shown moving vertically upward within a borehole. In general, a bow-spring centralizer 53 is used to center a probe such as a flowmeter in a borehole having a diameter greater than the outer diameter of the probe. Such centralizers are used for boreholes ranging in size from only slightly larger than a probe to many times the diameter of the probe. A conventional axially mounted bow-spring centralizer, shown in FIG. 6a-6c, is used to position the probe at the center of the borehole. The bow-spring centralizer 53 consists of a plurality of bow-springs 51 which are attached to/supported by sliders 52 which are free to slide on a mandrel 54, constrained only by two pairs of slider stops, outside stops 55 and inside stops 56.

As shown in FIG. 6a, outside slider stops 55 are located just beyond either end of bow-spring centralizer 53 when it is in a collapsed configuration and thus is at its maximum length. Inside slider stops 56 are positioned to allow the bow-spring centralizer 53 to open to its maximum working diameter, as shown in FIG. 6b. This configuration of inside and outside stops allows bowsprings 53 to centralize a probe as the probe is moved through a borehole having a varying diameter.

However, the bow-spring centralizer 53 constructed in accordance with the conventional design can become jammed, as indicated by reference numeral 58 in FIG. 6c, if the probe passes abruptly from a large diameter borehole 57 where the bow-springs 51 are in a fully expanded position into a small diameter hole 50, such as pipe or borehole casing, where the bow-springs 51 must collapse to a much smaller diameter. Such jamming causes severe bending and damage to the bowsprings. Such conditions frequently exist just below a well casing 50 where there is a large diameter washout 57.

Jamming results from friction caused by the expanded bow-springs 51 being placed against the edge of the small diameter well casing 50 thus pinning the upper bow-spring slider 52 against the upper inside stop 56 while the lower slider 52 is constrained by the lower outside stop 55. In this configuration, there is an insufficient distance between the upper inside stop 56 and lower outside stop 55 to allow bow-springs 51 to fully extend vertically. Thus the lower portion of bowsprings 51 remains horizontally extended and is damaged as the probe is raised through the narrower portion of the borehole.

In accordance with the invention as shown in FIGS. 6d and 6e, lower outside slider stop 55 is positioned sufficiently distant from upper inside slider stop 56 such that bow-springs 51 of an ascending probe can be fully extended even if upper slider 52 is against upper inside slider stop 56. Likewise, upper outside stop 55 is positioned a sufficient distance from lower inside slider stop 56 such that the bow-springs 51 of a descending probe are also protected. By placing outside slider stops or obstructions 55 relative to the inside slider stops 56 as described allows the bow-springs 51 to freely collapse even when moved abruptly from an expanded configuration in a large diameter hole into a much smaller diameter borehole or pipe 50. A bow-spring centralizer with this configuration does not require outside stops 55 and is approximately 20% longer than a conventional centralizer.

Referring again to FIG. 1, the flowmeter can be constructed to be of any diameter, constrained only by the minimum space required by the electronic components contained within flowsensor 7 and electronics module 1. Further the flowmeter can be used in any orientation, i.e. vertical, horizontal or diagonal, to measure the fluid flow within any diameter hole, pipe or tube.

The flowmeter permits fast and accurate measurements of slow borehole flow and requires less time and cost than previous devices and techniques. Further the flowmeter has no moving parts to jam or wear out and thus has a long usable lifetime. Also the flowmeter can withstand high hydrostatic pressure.

An important feature of the invention is that the flowmeter which measures both fluid flow and fluid temperature can be operated through a conventional geophysical logging cable having 3 or more conductors, each having several hundred ohms of resistance. Also, the flowmeter can be operated through long cables with the signal transmitted through the long cable being unaffected by stray currents in the earth surrounding the well. Finally, the flowmeter is of modular construction and is therefore easy to reconfigure, i.e. to change to a different size flow sensor or centralizer, or to repair in the field.

Although the invention has been described with respect to exemplary embodiments thereof, it will be understood by those skilled in the art that variations and modifications can be effected in these exemplary embodiments without departing from the scope and spirit of the invention.

What is claimed is:

1. A flowmeter for measuring the flow rate and direction of a fluid flow, said flowmeter comprising:
   thermopulse producing means for heating a portion of the fluid flow to thereby produce a thermopulse in the fluid flow which travels along with the fluid flow,
   thermopulse detecting means for detecting the thermopulse in the fluid flow, said thermopulse detecting means including first and second temperature sensing means disposed in the fluid flow on opposing sides of, and at known distances from, said thermopulse producing means, and support means for mounting said first and second temperature sensing means and extending parallel to the direction of the fluid flow such that dispersion of the thermopulse within the fluid flow resulting from turbulence therein caused by said support means is minimized, and
   timing means for measuring a time interval between the production of the thermopulse and the detection thereof by said detecting means, said time interval being representative of the flow rate.

2. The flowmeter of claim 1, wherein said thermopulse producing means comprises:
   a substantially planar wire grid immersed in said fluid at an angle perpendicular to the direction of fluid flow; and
   electrical means for conducting an electric current through said wire grid to heat said wire grid and thereby produce, by heat conduction, the thermopulse in the fluid flow.

3. The flowmeter of claim 2, wherein said electrical means for conducting current through said grid comprises:
   a capacitor connected to said grid for storing an electrical charge and for discharging the electrical charge into said grid; and
   an activation means connected to said capacitor for initiating the discharge of the electrical charge from said capacitor into said wire grid.

4. The flowmeter of claim 3, wherein said flowmeter further includes means for repeatedly charging said capacitor to a predetermined electrical charge and means for sensing whether said capacitor stores the predetermined electrical charge necessary to produce a thermopulse of a repeatable magnitude sufficient to be detected by said thermopulse detecting means throughout the desired range of fluid flow velocity.

5. The flowmeter of claim 3, wherein said means for activating the discharge of said capacitor is operator controllable.

6. The flowmeter of claim 2, wherein said wire grid is comprised of one substantially serpentine resistance wire with a electrical insulating coating.

7. The flowmeter of claim 1, wherein said first and second temperature sensing means comprise temperature sensitive resistors with an electrical insulating coating.

8. The flowmeter of claim 7, wherein each of said temperature sensitive resistors comprises a thermistor.

9. The flowmeter of claim 1 wherein said first and second temperature sensing means are disposed equal distances from said thermopulse producing means.

10. The flowmeter of claim 1, wherein said support means for mounting first and second temperature sensing means comprises opposing posts aligned parallel to the direction of fluid flow.

11. The flowmeter of claim 1, wherein said first and second temperature sensing means respectively provide first and second temperature signals representative of the temperature of the fluid as a function of time, the thermopulse detecting means further including:
means for subtracting the second temperature signal from the first temperature signal to provide a temperature difference signal; and
means for transmitting at least one of the first and second temperature signals and the temperature-difference signal to a display means for displaying the temperature and the temperature-difference signals as a function of time, such that a change in the displayed difference signal indicates the detection of the thermopulse at one of said temperature sensing means.

12. The flowmeter of claim 11, wherein said means for subtracting the second temperature signal from the first temperature signal includes a differential amplifier.

13. The flowmeter of claim 11, wherein said transmission means comprises:
means for converting the temperature signal and the temperature-difference signal into square-wave signals having frequencies proportional to the temperature and the difference in temperature respectively;
means for converting the respective square-wave signals into fixed-width bipolar pulse signals having pulse-repetition rates equal to the respective square-wave frequencies;
an electric cable for transmitting the respective bipolar pulse signals;
receiver means for receiving the bipolar pulse signals from said cable, said receiver means including filter means for separating the combined bipolar pulses according to pulse width; and
means for converting the separated bipolar pulse repetition-rate signals into respective temperature signals and temperature difference signals for further transmission to said display and recording means.

14. The flowmeter of claim 13, wherein
said means for converting the temperature signal and the temperature-difference signal into proportional-frequency signals each comprises a voltage to frequency converter;
said means for converting the respective proportional-frequency signals into fixed-width bipolar pulse signals each comprises a pulse shaper circuit; and
said filter means for separating the combined bipolar pulses according to pulse width each comprises a bandpass filter.

15. The flowmeter of claim 11, wherein display means displays either the first or second temperature signal.

16. The flowmeter of claim 11, wherein said means for displaying the difference signal as a function of time comprises a strip chart recorder.

17. The flowmeter of claim 11, wherein said thermopulse producing means and said first and second temperature sensing means together comprise a probe, said probe being connected to a surface electronics module which provides power to, and receives signals from, said probe, said surface electronics module also including said timing means and said means for displaying the temperature difference signal.

18. The flowmeter of claim 17, wherein said probe and said surface module are connected by a connecting electronic cable.

19. The flowmeter of claim 18, wherein said connecting cable may be over 15,000 feet long.

20. The flowmeter of claim 18, wherein said probe is axially symmetric.

21. The flowmeter of claim 20, wherein said flowmeter includes a centering means for centering said probe within the center of a borehole, said centering means comprising:
a mandrel;
upper and lower sliders which slide on the mandrel;
a plurality of bow springs connected to said sliders, said bow springs being of a selected length and each having upper and lower ends,
said upper ends being connected to said mandrel by said upper slider, said upper slider being adapted to slide along said mandrel between an upper inside slider stop and an outside slider obstruction,
said lower ends being connected to said mandrel by said lower slider, said lower slider being adapted to slide along said mandrel below a lower inside slider stop and any lower outside slider obstruction,
said upper inside slider stop being positioned along said mandrel at least said selected length from any said lower outside slider obstruction, and said lower inside slider stop being positioned along said mandrel at least said selected length from any said upper outside slider obstruction, such that said bow springs can fully extend to said selected length along said mandrel relative to the upper inside stop or relative to the lower inside stop, and
said probe being connected to said mandrel.

* * * * *